United States Patent [19]

Paik et al.

[11] Patent Number: 5,424,391

[45] Date of Patent: * Jun. 13, 1995

[54] PRODUCTION OF POLYSUCCINIMIDE BY THERMAL POLYMERIZATION OF FUMARAMIC ACID

[75] Inventors: Yi H. Paik, Princeton, N.J.; Graham Swift, Blue Bell, Pa.; Ethan S. Simon, Ambler, Pa.; Michael B. Freeman, Harleysville, Pa.

[73] Assignee: Rohm and Haas Company, Philadelphia, Pa.

[*] Notice: The portion of the term of this patent subsequent to Feb. 28, 2012 has been disclaimed.

[21] Appl. No.: 95,237

[22] Filed: Jul. 20, 1993

[51] Int. Cl.⁶ ..................... C08G 69/10; C08G 69/48
[52] U.S. Cl. ..................... 528/328; 528/332; 528/335; 528/345; 528/363; 526/303.1; 526/304; 525/420; 525/421; 525/422; 525/435; 252/51.5 A
[58] Field of Search ............... 528/345, 335, 328, 363, 528/332; 526/303.1, 304; 525/420, 421, 422, 435; 252/51.5 A

[56] References Cited

U.S. PATENT DOCUMENTS

| | | |
|---|---|---|
| 3,052,655 | 9/1962 | Fox et al. |
| 3,474,083 | 10/1969 | Shiga et al. |
| 3,623,985 | 11/1971 | Hendrickson ............... 251/51.5 A |
| 3,846,380 | 11/1974 | Fujimoto et al. |
| 3,923,751 | 12/1975 | Iwashita et al. ............... 528/328 |
| 4,363,797 | 12/1982 | Jacquet et al. |
| 4,590,260 | 5/1986 | Harada et al. ............... 528/328 |
| 4,681,692 | 7/1987 | Horodysky ............... 252/32.5 |
| 4,696,981 | 9/1987 | Harada et al. ............... 528/361 |
| 4,839,461 | 6/1989 | Boehmke ............... 528/328 |
| 4,911,856 | 3/1990 | Lokkesmoe et al. ............... 252/95 |
| 4,971,714 | 11/1990 | Lokkesmoe et al. ............... 252/95 |
| 5,057,597 | 10/1991 | Koskan ............... 528/499 |
| 5,112,507 | 5/1992 | Harrison ............... 252/51.5 A |
| 5,175,285 | 12/1992 | Lehmann et al. ............... 544/141 |
| 5,219,986 | 6/1993 | Cassata ............... 528/328 |
| 5,221,733 | 6/1993 | Koskan et al. ............... 528/328 |

FOREIGN PATENT DOCUMENTS

44-9394 4/1969 Japan.
52-8873B 3/1977 Japan.

OTHER PUBLICATIONS

Harada, K., "Polycondensation of Thermal Precursors of Aspartic Acid", Journal of Organic Chemistry, 24:1662–1666 (1959); Japanese Patent Appl. J 03-2712-65A, Published Dec. 3, 1991.

Kokufuta, E., et al., "Temperature Effect on the Molecular Weight and the Optical Purity of Anhydropolyaspartic Acid Prepared by Thermal Polycondensation", Bul. Chem. Soc. Japan, 51(5):1555–1556 (1978).

Neri, P., "Synthesis of Alpha, Beta-Poly [(2-hydroxyethyl)-DL-aspartamide], a New Plasma Expander", Journal of Medicinal Chemistry 16(8):893–897 (1973).

East German Pat. Appl. No. DD 262 665 A1, Published Dec. 7, 1988.

European Pat. Appl. No. 0511037A, Published Oct. 28, 1992.

Fox, S., "Thermal Polycondensation of Alpha-Amino Acids", Analytical Methods of Protein Chemistry, pp. 127–154, Permagon Press, Oxford (1966).

Fox S., et al., "Thermal Copolymerization of Amino Acids in the Presence of Phosphoric Acid", Archives of Biochemistry and Biophysics, 86:281–285 (1960).

*Primary Examiner*—Paul R. Michl
*Assistant Examiner*—P. Hampton-Hightower
*Attorney, Agent, or Firm*—David Banchik

[57] ABSTRACT

A method for producing polysuccinimide is provided. Thermal polymerization of fumaramic acid at a temperature of from about 160° C. to about 330° C. produces polysuccinimide. The reaction is optionally conducted in the presence of one or more processing aids, solvents or diluents. The polysuccinimide is particularly useful as a detergent additive.

24 Claims, No Drawings

PRODUCTION OF POLYSUCCINIMIDE BY THERMAL POLYMERIZATION OF FUMARAMIC ACID

FIELD OF THE INVENTION

The present invention relates to a process for preparing polysuccinimide by the thermal polymerization of fumaramic acid. This invention also relates to the use of polysuccinimide prepared from the thermal polymerization of furmaramic acid as a detergent additive.

BACKGROUND OF THE INVENTION

Polysuccinimide is useful as a precursor for the preparation of poly(aspartic acid). Both polysuccinimide and poly(aspartic acid) are useful as scale inhibitors, detergents, pigment and mineral dispersants, additives for fertilizers, and corrosion and scale inhibitors in boilers and cooling towers. Several processes are known for the production of polysuccinimide. However, the known methods for the synthesis of polysuccinimide are complex, expensive, or require excessively long process times. The expense of these processes may be a result of the starting material used, the process conditions, or the recovery steps.

One method for the synthesis of anhydropoly(aspartic acid), also known as polysuccinimide, is disclosed in U.S. Pat. No. 5,057,597 to Koskan. This process uses aspartic acid as a starting material, and requires fluidizing the aspartic acid by agitation in a nitrogen atmosphere at a temperature of at least 180° C. for three to six hours. The resultant anhydropoly(amino acid) is then hydrolyzed to poly(aspartic acid).

U.S. Pat. No. 4,590,260 to Harada, et al. discloses a process for preparing copoly(amino acids) by admixing at least one species of amino acid with at least one compound selected from the group consisting of an ammonium salt of malic, maleic or fumaric acid, or that of the monoamide thereof; or malic, maleic or fumaric acid monoamide or diamide; and subjecting the mixture to thermal polycondensation and then hydrolysis.

U.S. Pat. No. 4,696,981 to Harada, et al. discloses a process for preparing homopoly(amino acids) by the application of microwaves to a mixture of one or more kinds of monoammonium, diammonium, monoamide, diamide or monoamideammonium salts of malic acid and/or maleic acid and/or fumaric acid. The resulting poly(amino acid) imide is then hydrolyzed to form the corresponding poly(amino acid).

Japanese Pat. No. 44-09394B to Kobayashi, et al. discloses a process for preparing polysuccinimide by the polymerization of maleimide in the presence of a basic catalyst and a vinyl polymerization inhibitor.

U.S. Pat. No. 3,923,751 to Iwashita, et al. discloses a process for preparing poly(amino acids) by polymerizing amino acid halide salt in a non-polar organic solvent in the absence of a base. The amino acid halide salts include amino acid chloride hydrochlorides and amino acid bromide hydrobromides.

Japanese Pat. No. 52-08873B to Ariyoshi, et al. discloses a process for preparing poly(aspartic acid) by polymerizing the hydrohalic salts of aspartic acid anhydride, optionally in a non-polar organic solvent.

A method for the synthesis of poly(aspartic acid) front the ammonium salt of maleic acid is disclosed in U.S. Pat. No. 4,839,461 to Boehmke. This process is carried out by heating maleic acid or maleic anhydride, which changes into maleic acid while being heated with water, and ammonia to give a dry melt of the monoammonium to biammonium salts which, if the temperature is raised, is converted at 120 to 150° C. into poly(aspartic acid). The maleic acid and ammonia are reacted in a molar ratio of 1:1–1.5. The mixture is then heated to 120°–150° C. and the resulting solution of ammonium salt of maleic acid is evaporated, leaving a crystal mash. The crystal mash is then melted, during which time the waters of condensation and crystallization distill off. A porous mass of poly(aspartic acid) results. The entire process requires six to eight hours to complete.

These known methods for the synthesis of polysuccinimide are time consuming, complex, expensive and inefficient.

It is an object of this invention to provide a process for producing polysuccinimide by the thermal polymerization of fumaramic acid.

SUMMARY OF THE INVENTION

The present invention provides a process for producing polysuccinimide by heating fumaramic acid to a temperature of front about 160° to about 330° C.

DETAILED DESCRIPTION OF THE INVENTION

The process of the present invention is the thermal polymerization of fumaramic acid to produce polysuccinimide. Polysuccinimide can be produced by heating fumaramic acid, or a solution or suspension of fumaramic acid. The process of the present invention is conducted at a temperature of from about 160° C. to about 330° C., preferably from about 165° C. to 280° C.

Fumaramic acid has the following structure:

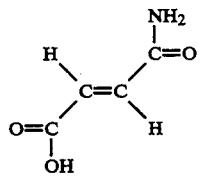

Fumaramic acid can be prepared, for example, by heating the monoammonium salt of fumaric acid. Fumaramic acid can also be prepared by reacting maleic anhydride with anhydrous ammonia, either neat or in an organic solvent such as toluene. We have found that when fumaramic acid, or a suspension or solution thereof, is heated to about 160° C. to about 330° C., polysuccinimide is formed. It is believed, although the present invention is not intended to be limited thereby, that the mechanism by which polysuccinimide is formed during the thermal polymerization of fumaramic acid is via (a) the Michael-type addition of the —NH$_2$ group of one fumaramic acid molecule into the double bond of a second fumaramic acid molecule, and (b) the loss of water due to cyclization of the acid group and the —NH group. The resulting polysuccinimide, thus contains repeating units of the formula:

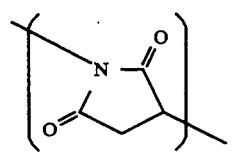

fumaramic acid is a solid material which when heated at a temperature of from about 160° C. to about 330° C. undergoes a reaction to form polysuccinimide. Polysuccinimide formation occurs rapidly in this temperature range. The thermal polymerization can be conducted over 7 hours or more without detriment to the product, although it is more economical to conduct the reaction for from about 2 minutes to about 6 hours, most preferably from about 5 minutes to about 5 hours. As the reaction proceeds at this temperature, the fumaramic acid undergoes several phase changes on its way to forming polysuccinimide. The fumaramic acid changes from a white powder, to a yellowish powder, to a yellowish-brown cake, to powdered polysuccinimide. As the reaction proceeds from the taffy-like mass, foaming is observed.

In one embodiment of the present invention, the thermal polymerization of fumaramic acid is conducted using any conventional equipment which is capable of heating the fumaramic acid to a temperature of from about 160° C. to about 330° C. for up to about 7 hours. Suitable equipment for the thermal polymerization reaction of fumaramic acid includes ovens, belt dryers, drum dryers, agitated vessels, tray dryers, extruders, scraped wall reactors, double planetary mixers, interplanetary mixers, turbodryers, fluidized bed dryers, screw conveyor devices, concurrent and countercurrent-solids conveyor mixers, ribbon blenders, calciners and kiln dryers. In an alternative embodiment of the present invention, two or more pieces of equipment are used to heat the fumaramic acid to a temperature of from about 160° C. to about 330° C. For example, one piece of equipment may be more suited to handling the reaction as it proceeds through the foaming phase, while another piece of equipment might be more efficient at maintaining the reaction at the elevated temperatures until the reaction is completed. In general, it is desirable to utilize equipment which agitates the heated fumaramic acid, thus minimizing the foaming which is observed as the reaction proceeds from the taffy-like phase. The thermal polymerization of the fumaramic acid can be conducted at subatmospheric pressure, atmospheric pressure, or supraatmospheric pressure. It is preferred to conduct the thermal polymerization reaction at atmospheric or subatmospheric pressure because the removal of the water which is liberated during the course of the reaction is facilitated. The thermal polymerization reaction can be conducted in an atmosphere of nitrogen, air, ammonia, carbon dioxide, or other inert gases.

In another embodiment of the present invention, the thermal polymerization of fumaramic acid is conducted in the presence of one or more processing aids using any conventional equipment which is capable of heating the fumaramic acid to a temperature of from about 160° C. to about 330° C. for up to about hours. The processing aids may help to reduce the level of foaming which is otherwise observed as the reaction proceeds from the taffy-like mass. The processing aids may further act to increase heat-transfer, reduce viscosity of the reacting mixture, or enhance the removal of the water liberated from the condensation. Suitable processing aids include zeolites, sulfates, carbonates, silicates, clays, glass beads, polymeric granules and polycarboxylates. Preferred processing aids include zeolite, sodium sulfate, sodium silicate, silica gel., magnesium stearate, alkylnaphthalenesulfonates, citric acid and polysuccinimide.

When used, the one or more processing aids may be present at a level which provides a weight ratio of fumaramic acid to processing aid of from about 100:1 to When the process of the present invention is conducted as a suspension or solution of fumaramic acid, the suspension or solution will generally contain from about 5 to about 95 percent by weight fumaramic acid, preferably from about 10 to about 75 percent by weight fumaramic acid.

The thermal polymerization of fumaramic acid as a suspension or dispersion can be conducted at subatmospheric pressure, atmospheric pressure, or supraatmospheric pressure. It is preferred to conduct the thermal polymerization reaction at atmospheric or subatmospheric pressure because the removal of the water which is liberated during the course of the reaction is facilitated. However, if a volatile suspending agent or solvent is used, it may be necessary to conduct the reaction under supraatmospheric pressure to achieve the required reaction temperature. The thermal polymerization reaction of fumaramic acid as a suspension or solution can be conducted in an atmosphere of nitrogen, air, ammonia, carbon dioxide, or other inert gases.

The following examples are embodiments of the general process discussed herein above and are intended by way of illustration only and are not intended to limit the invention in any way. The weight average molecular weights ($M_w$) and number average molecular weights ($M_n$) are measured by aqueous gel permeation chromatography (G.P.C.) relative to a 4,500 Mw poly(acrylic acid) standard. 1H NMR spectroscopy confirmed the identity of the product as polysuccinimide in each of the following examples.

Thermal Polymerization of Fumaramic Acid in an Oven to Form Polysuccinimide

EXAMPLE 1

A 5 gram sample of monoammonium salt of fumaric acid was placed in a glass beaker. The bed depth of the sample was about 0.5 centimeters. The beaker was placed in a muffle furnace at atmospheric pressure preheated 210° C. After 2 hours at 210° C., the beaker was removed from the oven. The polysuccinimide had a Mw of 2420 and Mn of 2110.

EXAMPLE 2

The procedure of Example I was followed except the temperature was 240° C. and the beaker was removed after I hour. The polysuccinimide had a Mw of 2100 and Mn of 1860.

EXAMPLE 3

The procedure of Example 1 was followed except the temperature was 240° C. and the beaker was removed after 5 hour. The polysuccinimide had a Mw of 2040 and Mn of 1810.

Thermal Polymerization of Fumaramic Acid in a Heated/ Agitated Vessel to Form Polysuccinimide

EXAMPLE 4

To a 100-milliliter glass reaction kettle equipped with mechanical stirring and an inlet for nitrogen was charged with 10 grams of monoammonium salt of fumaric acid. The stirrer was turned on, a sweep of nitrogen through the flask was begun and the flask was immersed in an oil bath preheated to 240° C. The contents of the kettle were stirred while maintaining the temperature of the oil bath for 5.6 hours. The polysuccinimide had a Mw of 2210.

Thermal Polymerization of a Solution of Fumaramic Acid to Form Polysuccinimide

EXAMPLE 5

To a 100-milliliter round bottom flask equipped with a magnetic stirring bar and an inlet for nitrogen was charged 10 grams of monoammonium salt of fumaric acid and 20 grams of sulfolane. The flask was immersed in an oil bath. The magnetic stirrer was turned on, a sweep of nitrogen through the flask was begun and the oil bath was heated to 200° C. The flask was maintained in the oil bath at 200° C. for 0.75 hours. The solution was allowed to cool to room temperature. To the resulting thick, dark brown solution was added 25 milliliters of water. A brown precipitate was formed. The precipitate was collected by filtration and washed with water. The polysuccinimide had a $M_w$ of 2020.

Thermal Polymerization of Suspensions of Fumaramic Acid to Form Polysuccinimide

EXAMPLE 6

To a 100-milliliter round bottom flask equipped with a magnetic stirring bar and an inlet for nitrogen was charged 5 grants of monoammonium salt of fumaric acid and 20 milliliters of tetrahydronaphthalene. The flask was immersed in an oil bath. The magnetic stirrer was turned on, a sweep of nitrogen through the flask was begun and the oil bath was heated to 200° C. The flask was maintained in the oil bath at 200° C. for 3 hours. The temperature of the oil bath was raised to 240° C. and the flask was maintained in the oil bath at 240° C. for 1 hour. The suspension was allowed to cool to room temperature, was filtered in a Buchner funnel, and washed with acetone to give a brown powder. The polysuccinimide had a $M_w$ of 2,260.

Soil Removal and Anti-Redeposition Performance Evaluation

The efficacy of polysuccinimide for clay soil removal and anti-redeposition was evaluated by washing soiled cotton and cotton/terry blended fabrics in the detergent formulation shown in Table I.

Cotton cloth #405 was purchased from Test Fabrics, Inc. (Middlesex; N.J.) and cut to a specified size ($3\frac{1}{2}"\times 4\frac{1}{2}"$). The cloths were then soiled by applying from 0.9 to 1.1 grants of a 50% clay slurry (in water) using a China bristle brush (#10). The soil was "painted" onto the cloth inside a 2" diameter circle and allowed to air dry overnight prior to laundering. The clay used to soil the cloths was a reddish-brown particulate clay.

The detergent compositions were tested in a Terg-o-Tometer at the following conditions; 40° C., 100 rpm, 100 ppm hardness (50% city tap water/50% de-ionized water), 12 minute wash with one 3 minute rinse, 1300 ppm detergent and 5 cloths per pot (3 of them soiled). The wash water was pre-heated, the fabric swatches were added and then dissolved detergent (2.6 grants of a 50% slurry in 100 milliliters water) was added. Following the wash period, the swatches were wrung, and following the rinse cycle, the swatches were wrung again and then air dried. Swatches washed in a detergent containing no polymer were always run as a control.

Reflectance was measured using a Pacific Scientific Colorimeter (Colorgard System 1000) and the data recorded using the L,a,b color scale. Detergency values (E), a measure of soil removal, and whiteness index (W.I.), a measure of anti-redeposition, are calculated as:
$E=((L_s-L)^2+(a_s-a)^2+(b_s-b)^2)0.5$ $W.I.=(L/100)*(L-(5.715*.b))$ where $L_s$, $a_s$, and $b_s$ are the reflectivity reading for the soiled swatches and L,a,b are the reflectivity readings for the washed swatches. Each polymer was evaluated in three separate washing experiments. The detergent composition and levels of the components in parts by weight ("pbw") are shown in Table I. This composition was used for the above described performance evaluation and the results of the detergent performance evaluation are listed in Table III. The reflectance of the soiled cloths was measured before laundering so that only cloths of the same reflectance were used in a test. Reflectance was then measured after laundering to evaluate the efficacy of the polysuccinimide in the detergent. The values reported in Table III are the average of the change in detergency and whiteness index of three cloths relative to the control cloths laundered in detergent not containing polymer. Positive numbers indicate an increase in detergency or whiteness index.

Additional detergent formulations representative, but not limited to, possible formulations in which polysuccinimides may be used are shown in Table II.

TABLE I

| WASH CONDITIONS | |
|---|---|
| APPARATUS | Terg-o-tometer washing machine |
| AGITATION | 100 revolutions per minute |
| TEMPERATURE | 40° C. |
| WATER HARDNESS | 100 parts per million ("ppm") |
| WASH CYCLE | 12 minutes |
| RINSE CYCLE | 3 minutes |
| WATER LEVEL | 1 liter |
| DETERGENT DOSAGE | 1300 ppm |
| BALLAST | 5 cloths per load (3 soiled/2 unsoiled) |

| Detergent Composition Used to Evaluate Polysuccinimide for Soil Removal and Anti-Redeposition | |
|---|---|
| Detergent Component | pbw |
| sodium carbonate | 22.0 |
| zeolite A | 16.0 |
| sodium silicate | 2.7 |
| LAS | 8.3 |
| lauryl sulfate | 8.3 |
| sodium sulfate | 34.0 |
| polymer | 3.0 |

TABLE II

| Example | Temp (°C.) | Time | Processing Aid | $M_w$ | E | W.I. |
|---|---|---|---|---|---|---|
| 1 | 210 | 2 hr | — | 2420 | 1.2 | 6.0 |
| 3 | 240 | 5 hr | | 2040 | 2.0 | 5.8 |

The data in Table II shows that fumaramic acid heated to a temperature of above 160° C. forms polysuccinimide which is useful as a detergent additive. The data also shows that the process of the invention can be carried out with or without mixing and can be carried out in the presence of one or more processing aids, diluents or solvents.

We claim:

1. A method for producing polysuccinimide comprising heating fumaramic acid to a temperature of front about 160° to about 330° C.

2. The method of claim 1, wherein the temperature is front about 165° C. to about 280° C.

3. The method of claim 1, wherein the fumaramic acid is heated to a temperature of from about 160° to about 330° C. for front about 2 minutes to about 6 hours.

4. The method of claim 1, wherein the fumaramic acid is in the presence of one or more processing aids.

5. The method of claim 4, wherein the one or more processing aids are selected from the group consisting of zeolites, sulfates, carbonates, silicates, and clays.

6. The method of claim 5, wherein the one or more processing aids are selected from the group consisting of zeolites, sodium sulfate, sodium silicate, and silica gel.

7. The method of claim 4, wherein the one or more processing aids are selected from the group consisting of polycarboxylate, alkylnapthalenesulfonates and magnesium stearate.

8. The method of claim 4, wherein the one or more processing aids are present at a level which provides a weight ratio of processing aid to fumaramic acid of from about 100:1 to about 1:100.

9. The method of claim 4, wherein the one or more processing aids are present at a level which provides a weight ratio of processing aid to fumaramic acid of front about 50:1 to about 1:50.

10. The method of claim 1, wherein the fumaramic acid is suspended in one or more diluents.

11. The method of claim 10, wherein the diluent is selected from the group consisting of anionic surfactants, cationic surfactants and zwitterionic surfactants.

12. The method of claim 10, wherein the diluent is tetrahydronaphthalene.

13. The method of claim 10 wherein the fumaramic acid is present at a level of about 5 to about 95 weight percent fumaramic acid based on the total weight of diluent and fumaramic acid.

14. The method of claim 13 wherein the fumaramic acid is present at level of about 10 to about 75 weight percent fumaramic acid based on the total weight of diluent and fumaramic acid.

15. The method of claim 1, wherein the fumaramic acid is dissolved in one or more solvents.

16. The method of claim 15, wherein the one or more solvents are selected from the group consisting of N-methylpyrrolidinone, sulfolane, dimethyl sulfoxide, and dimethylformamide.

17. The method of claim 15 wherein the fumaramic acid is present at a level of about 5 to about 95 weight percent fumaramic acid based on the total weight of solvent and fumaramic acid.

18. The method of claim 17 wherein the fumaramic acid is present at a level of about 10 to about 75 weight percent fumaramic acid based on the total weight of solvent and fumaramic acid.

19. Polysuccinimide prepared by the method of claim 1.

20. A detergent comprising the polysuccinimide prepared by the method of claim 1.

21. The method of claim 7, wherein the one or more processing aids are selected from the group consisting of magnesium stearate, alkylnaphthalenesulfonates, and citric acid.

22. The method of claim 4, wherein the one or more processing aids is glass beads.

23. The method of claim 4, wherein the one or more processing aids is polymeric granules.

24. The method of claim 23, wherein the one or more processing aids is polysuccinimide.

* * * * *

UNITED STATES PATENT AND TRADEMARK OFFICE
CERTIFICATE OF CORRECTION

PATENT NO. : 5,424,391

DATED : June 13, 1995

INVENTOR(S) : Michael B. Freeman, Yi H. Paik, Ethan S. Simon, Graham Swift

It is certified that error appears in the above-indentified patent and that said Letters Patent is hereby corrected as shown below:

Column 6, line 67 "front" should be --from--.

Column 7, line 2 "front" should be --from--.

Column 7, line 5 "front" should be --from--.

Signed and Sealed this

Fifteenth Day of August, 1995

Attest:

BRUCE LEHMAN

*Attesting Officer*     *Commissioner of Patents and Trademarks*